(12) United States Patent
Langford

(10) Patent No.: US 10,054,804 B1
(45) Date of Patent: Aug. 21, 2018

(54) EYEGLASSES FRAME FRONT TETHER

(71) Applicant: Roy Howard Langford, San Francisco, CA (US)

(72) Inventor: Roy Howard Langford, San Francisco, CA (US)

( * ) Notice: Subject to any disclaimer, the term of this patent is extended or adjusted under 35 U.S.C. 154(b) by 73 days.

(21) Appl. No.: 14/210,324

(22) Filed: Mar. 13, 2014

(51) Int. Cl.
  *G02C 11/00* (2006.01)
  *G02C 5/00* (2006.01)

(52) U.S. Cl.
  CPC .............. *G02C 11/00* (2013.01); *G02C 5/008* (2013.01); *G02C 5/006* (2013.01); *G02C 2200/02* (2013.01); *G02C 2200/06* (2013.01)

(58) Field of Classification Search
  CPC .... G02C 3/006; G02C 11/00; G02C 2200/02; G02C 2200/06; G02C 5/006; G02C 5/008
  USPC .......................................... 351/156, 157, 158
  See application file for complete search history.

(56) References Cited

U.S. PATENT DOCUMENTS

| | | | |
|---|---|---|---|
| 175,821 A | 4/1876 | Clawson | |
| 1,026,272 A | 5/1912 | Leveque | |
| 5,005,263 A * | 4/1991 | Barrett | G02C 3/003 24/3.3 |
| 5,092,668 A | 3/1992 | Welch et al. | |
| 5,235,727 A | 8/1993 | McCloskey | |
| 5,278,591 A * | 1/1994 | Trotter | 351/112 |
| 5,475,449 A * | 12/1995 | Pyle | A61F 11/12 181/130 |
| 5,593,024 A * | 1/1997 | Seiler | G02C 3/003 206/5 |
| 5,956,812 A | 9/1999 | Moennig | |
| 6,330,962 B1 | 12/2001 | Rodriguez | |
| 6,332,532 B1 * | 12/2001 | Lee | G02C 11/00 206/234 |
| 7,134,751 B1 * | 11/2006 | Copia | 351/57 |
| 7,229,171 B2 | 1/2007 | Dietz | |
| 7,677,722 B1 | 3/2010 | Mednick et al. | |
| 8,469,511 B2 | 6/2013 | Miller et al. | |
| 2006/0055869 A1 | 3/2006 | Dietz | |
| 2010/0039610 A1 | 2/2010 | Mauro et al. | |
| 2012/0081656 A1 | 4/2012 | Miller et al. | |
| 2015/0000016 A1 * | 1/2015 | Crawford | A61F 9/029 2/423 |

* cited by examiner

*Primary Examiner* — Ricky Mack
*Assistant Examiner* — Daniele Manikeu

(57) ABSTRACT

A tether which passes through a hole in the eyeglass frame front or a hole affixed to the eyeglass frame front above either of the two lenses near the frame extension hinge. One end of the tether is held to the eyeglasses by a knot, bead, or protrusion which keeps it from passing through the hole in the eyeglass frame. The other end of the tether is attached to the clothing of the wearer. A gentle and secure removable, reusable, tension actuated tether coupling device for frame front of eyeglasses.

8 Claims, 10 Drawing Sheets

FIG. 2
FIG. 3

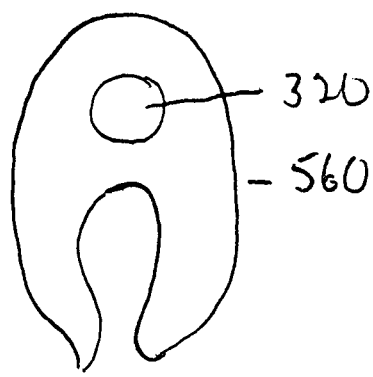
FIG. 8
FIG. 9
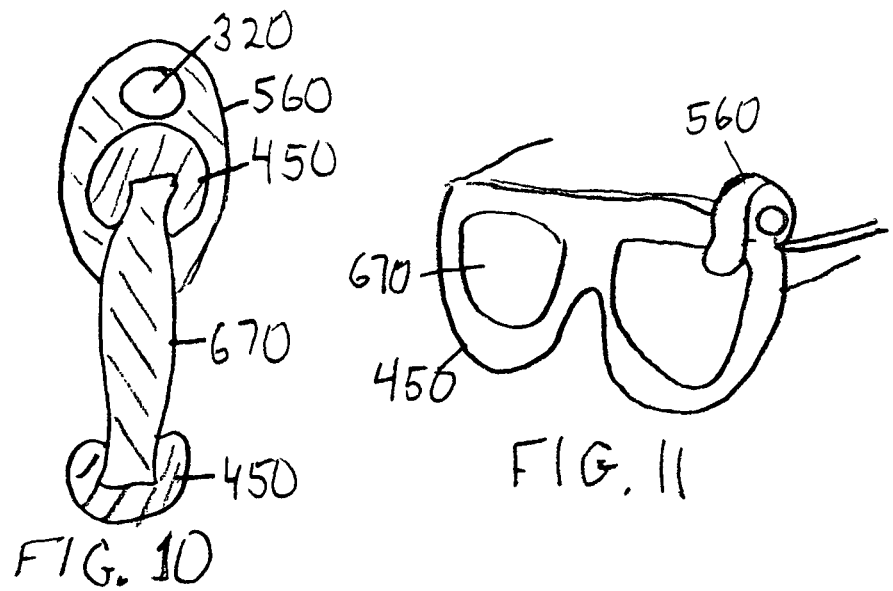
FIG. 10
FIG. 11

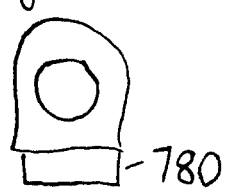
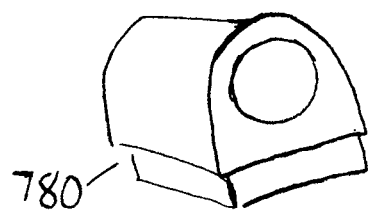
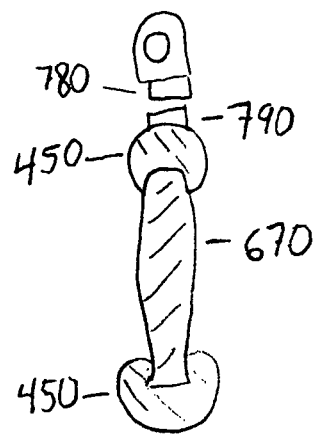
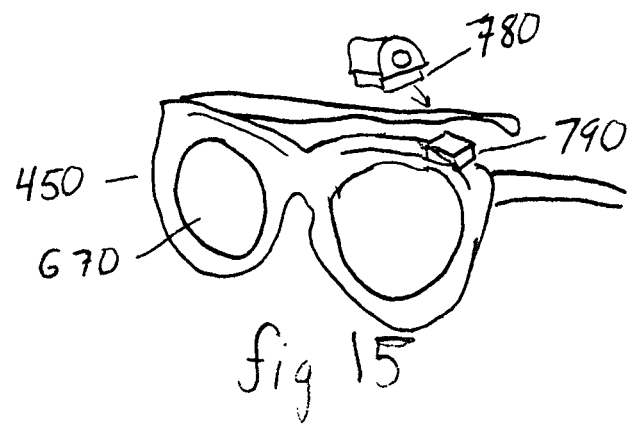

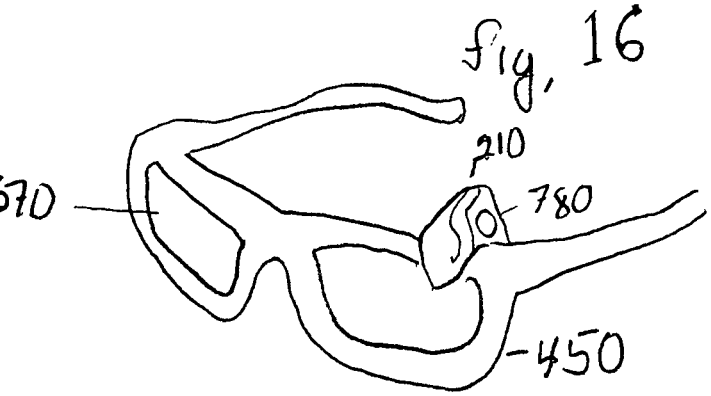
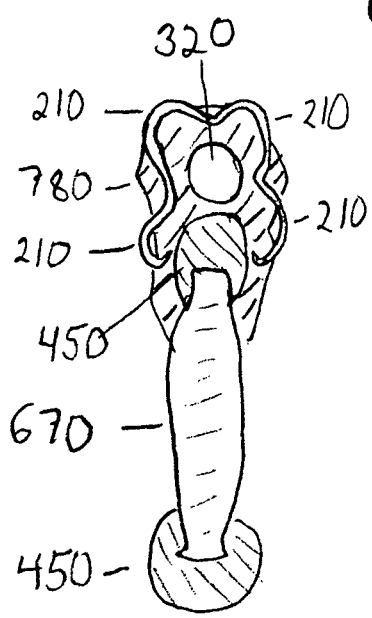
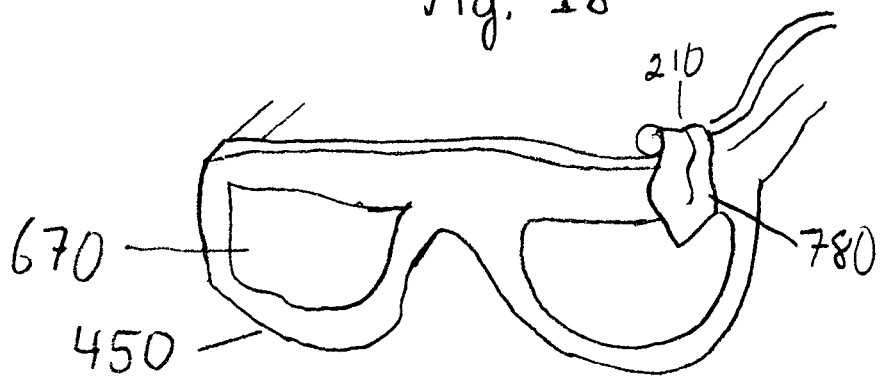

EYEGLASSES FRAME FRONT TETHER

An eyeglass tethering device as described in PROVISIONAL UTILITY PATENT APPLICATION No. 61/852,004 and filed on Mar. 14, 2013 is herein described. The original nonprovisional application claims benefit of and priority to U.S. Provisional Application No. 61/852,004, filed Mar. 14, 2013 and entitled "Eyeglass Tether," and which is incorporated by reference herein.

BACKGROUND

I was unable to find a satisfactory way of securing my reading glasses against loss, premature wear, and breakage. Holders didn't help my absent mindedness when I forgot to use the holder. Tethers went around my neck which I found to be obtrusive and uncomfortable. Holders required repeated folding and unfolding of the eyeglasses and resulted in premature failure of the hinges. Necklace type tethers resulted in snags and tugs and bumps that caused breakage usually at the hinges. I tried tethering my eyeglasses to my clothing by the temples (earpieces) of the eyeglasses. This also stressed the hinges and resulted in premature breakage. I decided to try tethering to the frame of the eyeglass near the hinge (frame extension) which is relatively strong. This worked well. I then devised a tension actuated removable, reusable, gentle, and secure tether which I could easily add or remove from any of my reading glasses. I have never seen anyone else using this method nor have I so far found any patent for such a tether. The patents I have so far reviewed described holders and not tethers. Also the patents I have so far reviewed even when they describe additions to the eyeglasses are attached to the temples (ear pieces) of the glasses and not to the frame of the eyeglasses. The term 'frame' is often used to refer to the eyeglasses body including the temple. The frame as I use it refers only to the frame front, the part that holds the lenses and rims and eye wire if any.

SUMMARY

I have invented a means of securing glasses against loss and breakage. The means of doing so is a tether which passes through a hole in the eyeglass frame front or affixed to the eyeglass frame front above either of the two lenses near the frame extension hinge. One end of the tether is held to the eyeglasses by a knot, bead, or protrusion which keeps it from passing through the hole in the eyeglass frame. The other end of the tether is attached to the clothing of the wearer. The tether may be attached to the clothing through a button hole using a knot, bead, or other protrusion (FIG. 1, FIG. 2, FIG. 3). Alternatively, the tether may be attached to the clothing with a magnet, clasp, clip, springhook, pin, or other such common device. The hole is added to the frame above either lens very near the hinge of the eyeglasses. The hole may be flush with the front of the lens or perpendicular (FIG. 7) to it. The hole is better set parallel to the lens as then the tether is less obtrusive and protruding.

The hole in the eyeglasses may be incorporated into the eyeglass frame at the point of manufacture (FIG. 4, FIG. 5, FIG. 6). Alternatively, the hole may be separately constructed and epoxied to the frame (FIG. 8, FIG. 9, FIG. 10, FIG. 11). Alternatively the hole may be separately constructed incorporating a magnet to adhere to magnetically responsive glass frames. (FIG. 12, FIG. 13). Alternatively, the hole may be constructed incorporating a magnet and bundled with a magnetically attractive mate which can be glued to the eyeglass frame (FIG. 14, FIG. 15).

Alternatively, a hole may be added with a removable, reusable and transferable device made of rubber or other moderately elastic and resilient material (FIGS. 16 through 21) preferably with the added support of a single retaining spring 210 (FIG. 19, FIG. 20, FIG. 21, FIG. 27, FIG. 28, FIG. 33, FIG. 34, FIG. 35).

This method of securing glasses is preferable to other current methods in that the glasses are always secured to the person. The person does not have to remember to put them in a pocket or case or secure them to a holder. If they remember, they will not wear out the glasses folding and unfolding them when they put them in the pocket, case, and holder. Thus if the eyeglasses are removed from the face they will simply hang from the article of clothing. Second, the eyeglasses will last longer because by being secured to a relatively very sturdy part of the eyeglass frame one will not put any additional wear on the hinges or temples (aka arms, aka earpieces) of the eyeglasses. Third, breakage will be reduced if the eyeglasses are snagged on something or tugged by something because the tether affixed to the clothing will likely release itself from the clothing allowing the eyeglasses to fall away without breaking. (Also, a magnetic or spring tension actuated removable device will likely detach before the glasses break.) Fourth, this device will not irritate the skin or cause discomfort by hanging around the neck. Fifth, this device will not obstruct or interfere with the use of the eyeglasses. Sixth, the eyeglasses will not get in the way when removed from the face by resting obtrusively on one's chest.

DESCRIPTION OF THE DRAWINGS

FIG. 2 shows the complete invention gently and securely tethering eyeglasses to a blouse.

FIG. 3 shows the complete invention gently and securely tethering eyeglasses to a shirt with eyeglasses in shirt pocket.

FIG. 8 shows a tethering device which can be added to the frame of eyeglasses by adhesion in a side view FIG. 9 shows a tethering device which can be added to the frame of eyeglasses by adhesion in a side view.

FIG. 10 shows a tethering device added to the frame of eyeglasses by adhesion in a cross-section view of lens and frame.

FIG. 11 shows a tethering device added to the frame of eyeglasses by adhesion in a ¾ view FIG. 12 shows a tethering device which can be added to the frame of eyeglasses by magnetic attraction in a side view.

FIG. 13 shows a tethering device which can be added to the frame of eyeglasses by magnetic attraction in a ¾ view.

FIG. 14 shows a tethering device being added to the frame of eyeglasses by magnetic attraction in a cross-section view of lens and frame.

FIG. 15 shows a tethering device being added to the frame of eyeglasses by magnetic attraction in a ¾ view.

FIG. 16 shows a gentle and secure removable, reusable, tension actuated tethering device on eyeglasses in ¾ view FIG. 17 shows a gentle and secure removable, reusable, tension actuated tethering device on eyeglasses in cross-section view of lens and frame.

FIG. 18 shows a gentle and secure removable, reusable, tension actuated tethering device on eyeglasses in front view.

DETAILED DESCRIPTION

Figure 1:
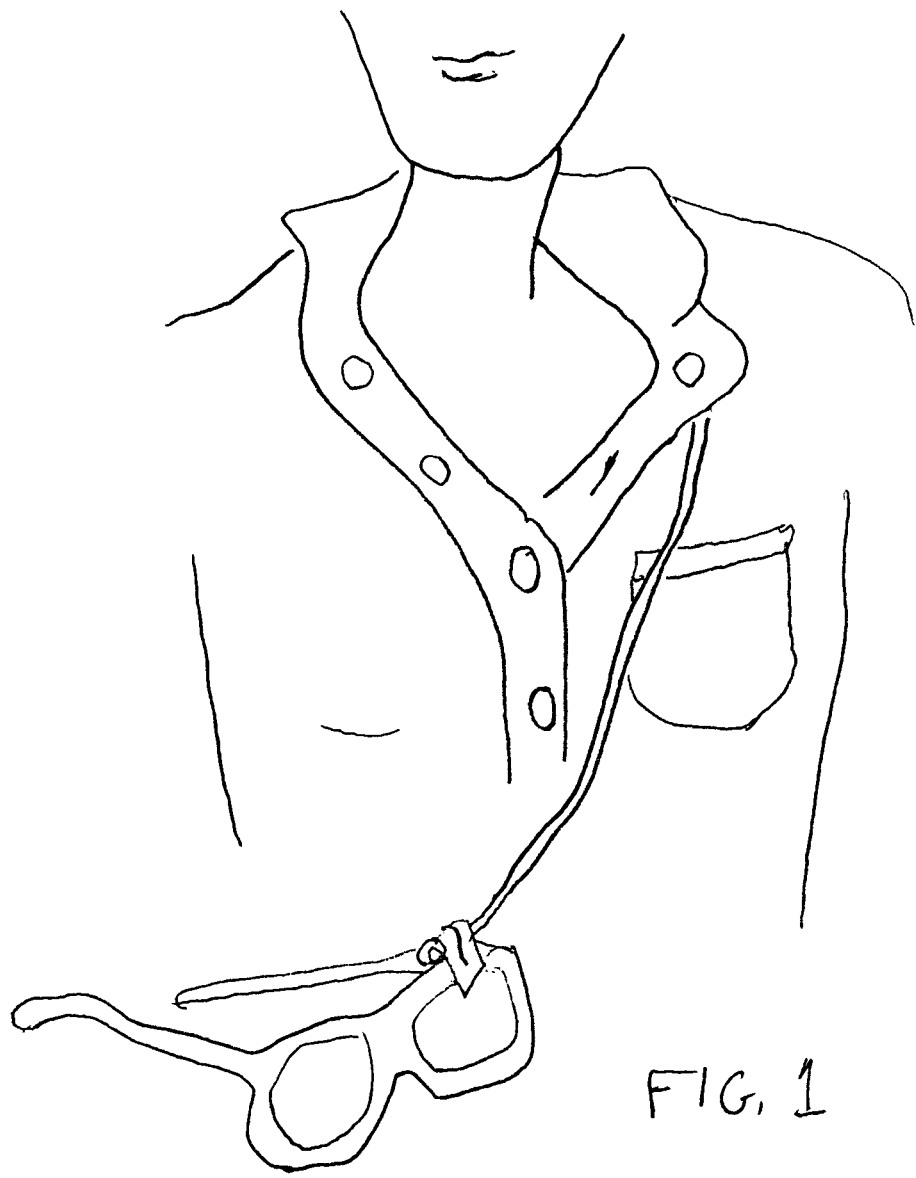
FIG. 1 shows the complete invention gently and securely tethering eyeglasses to a shirt allowing eyeglasses to hang freely.
Figure 4:
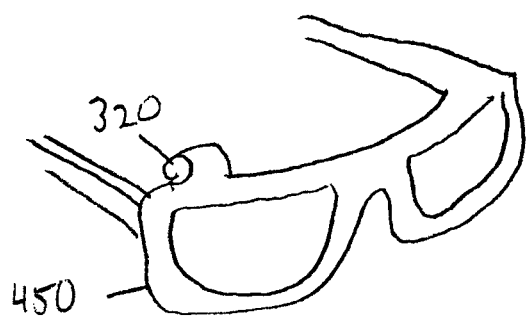
FIG. 4 shows the tethering device incorporated into the frame of eyeglasses in ¾ view
Figure 5:
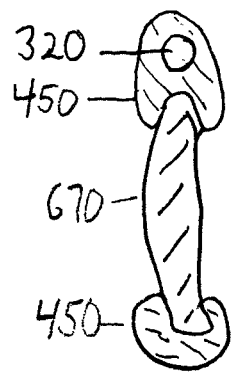
FIG. 5 shows the tethering device incorporated into the frame of eyeglasses in cross-section view of lens and frame.
Figure 6:
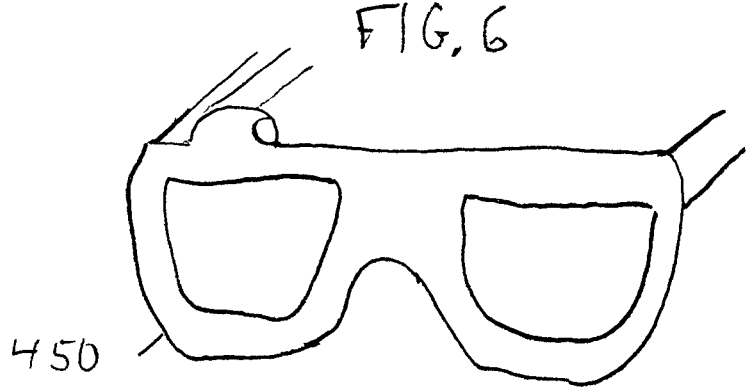
FIG. 6 shows the tethering device incorporated into the frame of eyeglasses in front view
Figure 7:
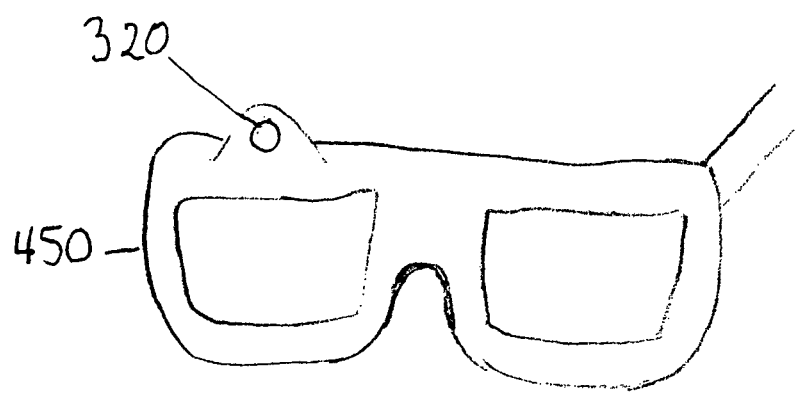
FIG. 7 shows a tethering device with hole cut perpendicular to lens front.
Figure 19:
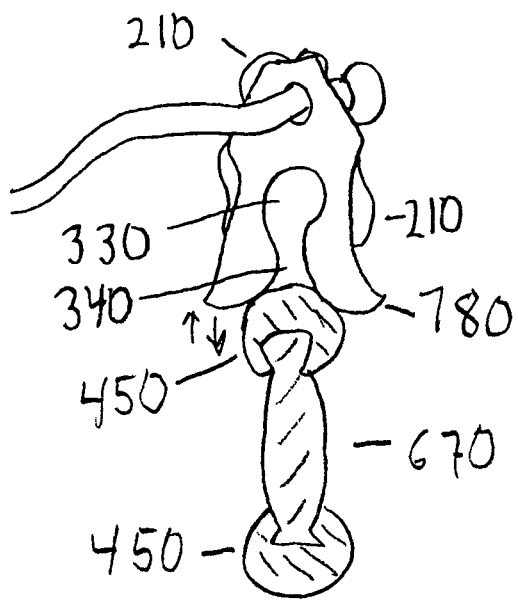
FIG. 19 shows the action for adding and removing the tension actuated tethering device on eyeglasses in cross-section view of lens and frame.
Figure 20:
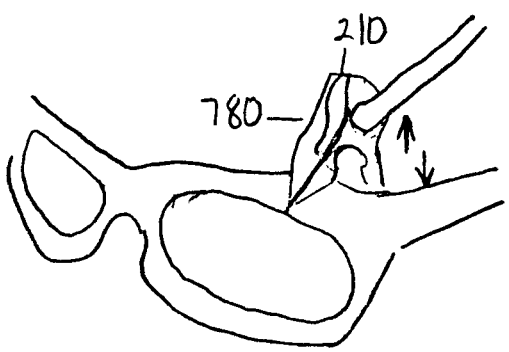
FIG. 20 shows the action for adding and removing the tension actuated tethering device on eyeglasses in ¾ view.
Figure 21:
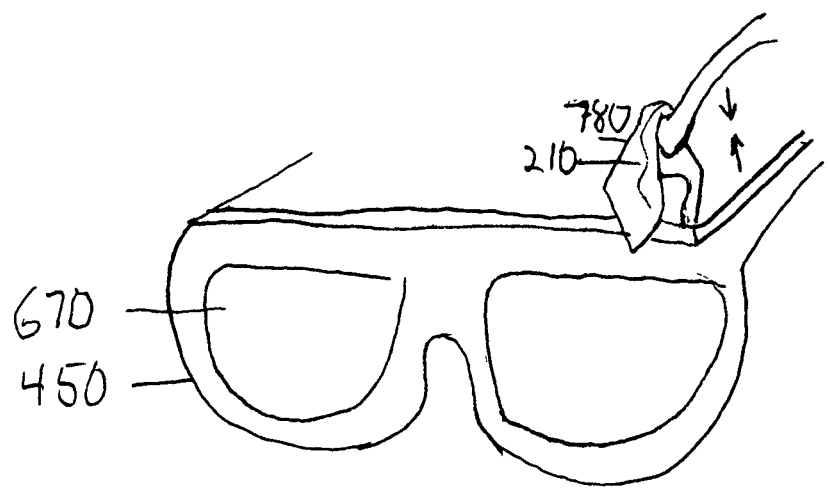
FIG. 21 shows the action for adding and removing the tension actuated tethering device on eyeglasses in front view.

The device is a hole added to or incorporated into the frame of eyeglasses near one frame extension. The following methods of construction are illustrative of the necessary elements of construction. The methods should not be construed to be the only or best methods of manufacture. The embodiments described below should not be construed to be the preferred embodiments of the invention. The methods described below do not preclude other materials, methods or embodiments of the device as described in the summary.

The device may be incorporated into the molding or winding of the eyeglass frame as appropriate by incorporating a hole 320 into the frame front 450 as exemplified in FIGS. 4 through 7.

The device 560 may be constructed of metal, plastic or a hardened mastic like epoxy and glued to the frame. One way is to use a fast drying stick epoxy putty. Cut off a small piece and knead it to activate the epoxy. Roll it into a small cylinder and fold the cylinder over a corner of one of the lenses near the hinge and press it down over both sides of the frame front 450 and a little bit of the lens (FIG. 10, FIG. 11). Pass a nail through the putty protruding from the top of the frame parallel to the face of the lens 670 to make a small hole. After a few minutes put a nail through the hole to clean and finish forming it. When it is dry you can put a cord or other tether through it. The easiest way is to tie a knot in one end of the cord. Pass the other end through the hole. Tie a knot in the other end. Pass this through a neck or collar button hole of your shirt. (FIGS. 8 through 11)

The device 780 may be separately constructed with a flattened bottom recessed for the gluing to the recess of a magnet to adhere to magnetically responsive glass frames. (FIG. 12, FIG. 13). Alternatively, the hole may be constructed incorporating a magnet and bundled with a magnetically attractive mate 790 which can be glued to the eyeglass frame (FIG. 14, FIG. 15).

Figure 22:
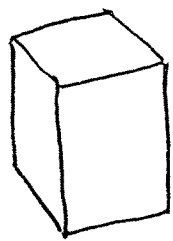
FIG. 22 shows material for construction of one possible tension actuated tethering device.
Figure 23:
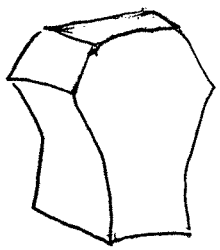
FIG. 23 shows construction of one possible tension actuated tethering device after shaping.
Figure 24:
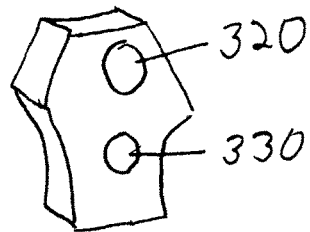
FIG. 24 shows construction of one possible tension actuated tethering device after drilling
Figure 25:
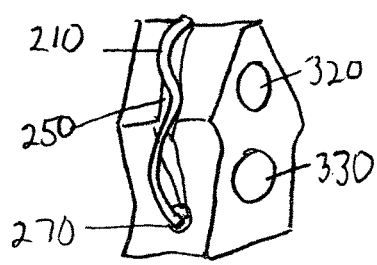
FIG. 25 shows construction of one possible tension actuated tethering device after incising groove in sides and top to accommodate spring.
Figure 26:
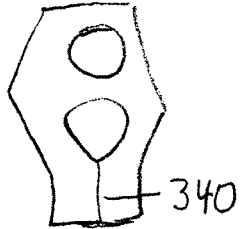
FIG. 26 shows construction of one possible tension actuated tethering device after shaping to accommodate eyeglass frame.
Figure 27:
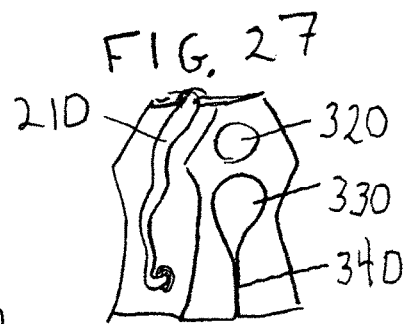
FIG. 27 shows construction of one possible tension actuated tethering device after adding spring tensioner.
Figure 28:
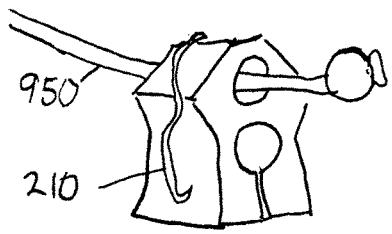
FIG. 28 shows construction of one possible tension actuated tethering device after adding tether with stopper.
Figure 29:
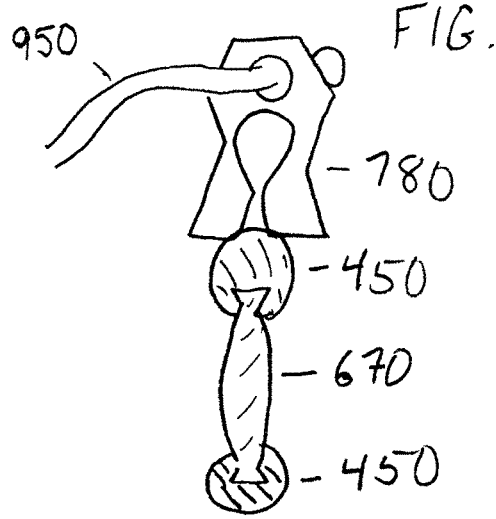
FIG. 29 shows manner of adding constructed tension actuated tethering device to eyeglasses in cross-section view of lens and frame.
Figure 30:
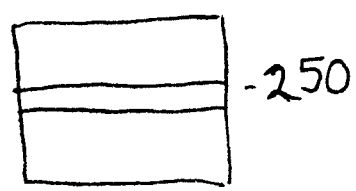
FIG. 30 shows top view of one possible embodiment of tension actuated tethering device
Figure 31:
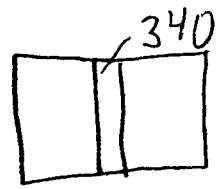
FIG. 31 shows bottom view of one possible embodiment of tension actuated tethering device
Figure 32:
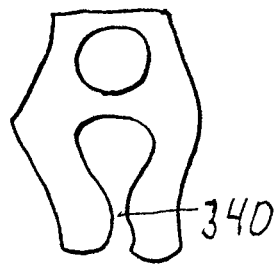
FIG. 32 shows side view of one possible embodiment of tension actuated tethering device.
Figure 33:
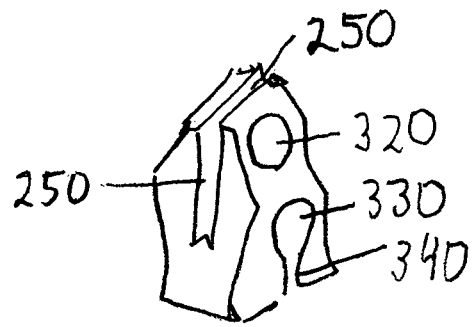
FIG. 33 shows ¾ view of one possible embodiment of tension actuated tethering device.
Figure 34:
FIG. 34 shows cross-section view of one possible embodiment of tension actuated tethering device with typical spring exposed.
Figure 35:
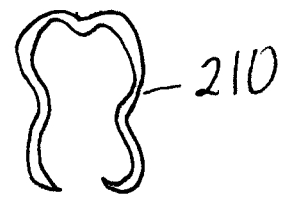
FIG. 35 shows one of various springs suitable for this one possible embodiment of tension actuated tethering device.

A removable device 780 may be constructed out of a piece of rubber or silicone. It of course can be molded. To better describe it consider constructing this device from a small piece of medium hard rectangular rubber block (FIG. 22) which is cut into a pleasing roughly rectangular, diamond, or oblong shape (FIG. 23). A hole 320 is drilled near the top. The hole should be just large enough to accommodate a cord or other tether. Another hole 330 parallel to the first hole is drilled beneath it about one third of the way from the top of the device (FIG. 24). This hole should be just large enough to accommodate the thickness of the frame. Then use a matte knife to cut through bottom of the material into the second hole (FIG. 26). The second hole may be appropriately trimmed The cut should be parallel to the length of the holes. The slit end 340 will be opened and slipped over the frame front 450 on to the lens 670 (FIG. 29). The small hole will accommodate the (usually) slightly larger frame while the ends will grip the lens non-abrasively. A tension spring or spring clip 210 will assure the device adheres to the eyeglasses. The spring is inserted (FIG. 27) into an appropriately sized groove 250 cut into the surface of the device (FIG. 25) on the three exposed surfaces of the device perpendicular to the direction of the holes drilled. Two small depressions 270 are drilled into the 2 exposed faces of the device parallel to the face of the lens. Into these depressions will go the ends of the spring which may be made from steel wire such as is used in bobby pins or paper clips. A tether 950 is threaded through the hole 320 (FIG. 28). The resultant device 780 is a tension actuated removable, reusable, tether coupling device which can be slipped onto or off of the frame front (FIG. 29, FIGS. 19 to 21). The completed device will gently, securely, and non-abrasively hold a tether to the eyeglasses (FIGS. 16, 17, and 18). The resultant device is shown in FIGS. 30 to 34 in views of top, bottom, side, ¾ view, and cross-sectioned to reveal spring clip in incised face. FIG. 35 shows one of several spring clips that would work.

A cam with a spring release or a latch with a spring may be substituted for the spring clip 210 described but this will be more obtrusive and less effective. A D-type spring clip or binder clip may be substituted for the spring clip but this would be overkill and risk damaging the glasses and so is not recommended.

The inventor claims the following:

1. A method for tethering a pair of eyeglasses to an article worn by a person comprising:
   a. incorporating an eyelet encompassing a through hole into the frame front of said eyeglasses, and
   b. fastening the first end of an elongated tether having two ends to an eyelet in said frame front of said eyeglasses, and
   c. joining the second end of said tether removably to said article, whereby the article is joined to said eyeglasses when said eyeglasses are not in use as well as when said eyeglasses are in use and herein, said eyeglasses defines as eyeglasses that have the front frame, temples and lenses and herein, said frame front of said eyeglasses is defined as all of said eyeglasses excluding the temples and excluding the temple stems and excluding the earpieces and excluding the nose bridge between the lenses and excluding the nose pads and excluding the pad arms and excluding the screws and excluding all of the hinges where said hinges are mounted or joined to but not part of said frame front.

2. A method for tethering a pair of eyeglasses to an article worn by a person comprising:
   a. attaching an eyelet encompassing a through hole into the frame front of said eyeglasses, and
   b. fastening the first end of an elongated tether having two ends to an eyelet in said frame front of said eyeglasses, and
   c. joining the second end of said tether removably to said article and whereby the article is joined to said eyeglasses when said eyeglasses are not in use as well as when said eyeglasses are in use and herein, said eyeglasses defines as eyeglasses that have the front frame, temples and lenses and herein, said frame front of said eyeglasses is defined as all of said eyeglasses excluding said temples and excluding the temple stems and excluding the earpieces and excluding the nose bridge between the lenses and excluding the nose pads and excluding the pad arms and excluding the screws and excluding all of the hinges where said hinges are mounted or joined to but not part of said frame front.

3. An eyeglass tether for holding a pair of eyeglasses to an article worn by a person comprising:
   a. an eyelet encompassing a through hole where said eyelet is joined to the frame front of said eyeglasses;
   b. an elongated tether having two ends where the first end of said tether is by means of joining attached to said eyelet on said frame front of said eyeglasses and
   c. said eyelet comprises an annulus with a bottom fitted to mate with said frame front fastened by adhesive and
   d. the second end of said tether is joined to said article and whereby the article is joined to said eyeglasses when said eyeglasses are not in use as well as when said eyeglasses are in use and herein, said eyeglasses defines as eyeglasses that have the front frame, temples and lenses and herein, said frame front of said eyeglasses is defined as all of said eyeglasses excluding said temples and excluding the temple stems and excluding the earpieces and excluding the nose bridge between the lenses and excluding the nose pads and excluding the pad arms and excluding the screws and excluding all of the hinges where said hinges are mounted or joined to but not part of said frame front.

4. An eyeglass tether for holding a pair of eyeglasses to an article worn by a person comprising:
   a. an eyelet encompassing a through hole where said eyelet is joined to the frame front of said eyeglasses;
   b. an elongated tether having two ends where the first end of said tether is by means of joining attached to said eyelet on said frame front of said eyeglasses and
   c. said eyelet comprises an annulus with a bottom fitted with a magnet to mate with said frame front and fastens to said eyeglasses by magnetic attraction and
   d. the second end of said tether is joined to said article and whereby the article is joined to said eyeglasses when said eyeglasses are not in use as well as when said eyeglasses are in use and herein, said eyeglasses defines as eyeglasses that have the front frame, temples and lenses and herein, said frame front of said eyeglasses is defined as all of said eyeglasses excluding said temples and excluding the temple stems and excluding the earpieces and excluding the nose bridge between the lenses and excluding the nose pads and excluding the pad arms and excluding the screws and excluding all of the hinges where said hinges are mounted or joined to but not part of said frame front.

5. An eyeglass tether for holding a pair of eyeglasses to an article worn by a person comprising:
   a. an eyelet encompassing a through hole where said eyelet is joined to frame front of said eyeglasses,
   b. an elongated tether having two ends where the first end of said tether is joined to an eyelet in the frame front of said eyeglasses, and
   c. said eyelet comprises a removable device affixed to the frame front of said eyeglasses by inserting a bit of said eyeglasses frame into the device through an elastic slit in its bottom forming a channel for mounting the device to said frame front and
   d. the second end of said tether is joined to said article, whereby the article is joined to said eyeglasses when said eyeglasses are not in use as well as when said eyeglasses are in use and herein, said eyeglasses defines as eyeglasses that have the front frame, temples and lenses and herein, said frame front of said eyeglasses is defined as all of said eyeglasses excluding said temples and excluding the temple stems and excluding the earpieces and excluding the nose bridge between the lenses and excluding the nose pads and excluding the pad arms and excluding the screws and excluding all of the hinges where said hinges are mounted or joined to but not part of said frame front.

6. An eyeglass tether of claim 5, wherein the removable device further comprises a spring tension actuating device to amplify the gripping action of said removable device.

7. An eyeglass tether for holding a pair of eyeglasses to an article worn by a person comprising:
   a. an elastic affixing device including a through hole, a channel and slit, said slit communicates said channel to the outer surface of said affixing device;
   b. an elongated tether having a first end including a bead or an enlargement at one end coupled to said through hole and a second end including an anchoring or a clasping means wherein said channel removably coupled to the front frame of said eyeglasses through said slit and said anchoring or clasping means removably coupled to said article.

8. The eyeglass tether according to claim 7, wherein the eyeglass tether further comprising a tension clip coupled to said elastic affixing device for gripping affixing device to said front frame.

\* \* \* \* \*